United States Patent

Miyadera et al.

[11] Patent Number: 5,149,374
[45] Date of Patent: Sep. 22, 1992

[54] DEVICE FOR FORMING LB FILM

[75] Inventors: Toshiyuki Miyadera; Makoto Okano; Fumio Matsui, all of Saitama, Japan

[73] Assignee: Pioneer Electric Corporation, Tokyo, Japan

[21] Appl. No.: 609,554

[22] Filed: Nov. 6, 1990

[30] Foreign Application Priority Data

Apr. 24, 1990 [JP] Japan .................................. 2-108321

[51] Int. Cl.[5] .......................... B05C 3/09; B05D 1/20
[52] U.S. Cl. ..................................... 118/691; 118/692; 118/696; 118/712; 118/402; 427/10; 427/434.3
[58] Field of Search ............... 118/689, 691, 696, 712, 118/402, 692; 427/430.1, 434.3, 10

[56] References Cited

U.S. PATENT DOCUMENTS

| 4,599,969 | 7/1986 | Barraud et al. | 118/402 X |
| 4,646,678 | 3/1987 | Grunfeld | 118/402 X |
| 4,987,851 | 1/1991 | Yasuda et al. | 118/402 X |
| 5,006,374 | 4/1991 | Wakayama et al. | 118/402 X |
| 5,021,268 | 6/1991 | Khanarian et al. | 118/402 X |
| 5,044,308 | 9/1991 | Mojtabaj | 118/402 |

FOREIGN PATENT DOCUMENTS 198497 10/1986 European Pat. Off. ............ 118/712

Primary Examiner—W. Gary Jones
Assistant Examiner—Todd J. Burns
Attorney, Agent, or Firm—Sughrue, Mion, Zinn, Macpeak & Seas

[57] ABSTRACT

An LB film forming device according to the present invention having a packing control device by which a barrier is moved under the control of the packing control device to compress a sample until the sample spreading over the surface of a subphase liquid provides a predetermined set surface pressure, the absorbance of the thus compressed sample is measured, and thereafter the barrier is moved under the control of the absorbance as desired so as to provide a predetermined set value of the absorbance. Such an LB film forming device may stably provide a film having predetermined film characteristics.

5 Claims, 3 Drawing Sheets

π-A CURVE

DEVICE FOR FORMING LB FILM

FIELD OF THE INVENTION AND RELATED ART

The present invention relates to a device for forming an LB film, particularly to a device for forming an LB film which has an improved packing unit for compressing a sample spread over a water surface in a water tank prior to the attachment of a monomolecular film to the surface of a substrate.

Recently, an organic ultrathin film known as "LB film" has become popular as a thin-film formation technique. The LB film has various advantages, for example, it is capable of providing good molecular controllability, molecules of various species are usable as a material therefor, and it may be prepared under normal temperature and normal pressure. Therefore the application of LB films have been researched in various fields.

In the preparation of an LB film, a technique is utilized for removing a packed monomolecular film from a water surface. However, a packing operation prior to the film removing step is very important. This is so because the resultant film characteristics may vary considerably with the packing state of the above-mentioned monomolecular film.

Conventionally, in order to remove a film exhibiting a good cohesion (or aggregate) state, a method of confirming the packing state has been utilized wherein a $\pi$ (film pressure)-A (molecule-occupied area) curve as shown in FIG. 4 and described below, is measured, and an appropriate film pressure is determined on the basis of the above-mentioned $\pi$-A curve.

More specifically, in the $\pi$-A curve as shown in FIG. 4, the formation of a monomolecular film showing regular orientation is initiated from a point a, and the oriented molecules are gradually packed so as to form a denser film in a substantially linear region b. Further, beyond a point c, the molecules exceed the limits of packing so as to cause buckling. Accordingly, the actual preparation of such a film has been effected within the linear region b.

In the conventional method using the $\pi$-A curve as described above, the film pressure (or membrane pressure) based on a change in a surface tension is monitored alone. Accordingly, the resultant films formed under the same pressure do not necessarily have the same film characteristics, and undesirable variations in film characteristics occur.

Particularly, in a case where a sample to be packed includes an organic dye (or coloring matter) to be used for a recording film of an optical recording medium, which forms a so-called "J-aggregate" in the course of the packing operation, it is desirable to confirm the formation of the J-aggregate. More specifically, as shown in FIG. 3, an absorbance peak is shifted to the longer wavelength side and the intensity thereof is also heightened on the basis of an increase in the film pressure of a dye film, and such a shift in wavelength is completed at a certain film pressure. Accordingly, whether the J-aggregate is properly formed or not may be determined by confirming the completion of the wavelength shift.

As described above, it is required to confirm the formation of the J-aggregate. In conventional devices, however, the J-aggregate is often not formed even when the above-mentioned $\pi$ value corresponds to a formation of the J-aggregate.

SUMMARY OF THE INVENTION

A principal object of the present invention is, in view of the above-mentioned problems encountered in the prior art, to solve these problems and to provide a device for forming an LB film which is capable of providing a film having stable film characteristics.

According to the present invention, a device for forming an LB film has, a packing unit for moving a barrier to compress a sample spreading over a surface of a subphase liquid reserved in a water tank, and a removal unit for removing a monomolecular film, which has been orientation-packed with the packing unit, and placing it onto the surface at a substrate. The packing unit has a packing control means which controls movement of the barrier so as to compress the sample until the sample spreading over the surface of the subphase liquid has a predetermined film pressure. An absorbance of the compressed sample is then measured, and thereafter the barrier is moved in a predetermined manner so as to provide a predetermined value of absorbance of the sample.

The present invention also provides a device for forming an LB film having, a packing unit for moving a barrier to compress a sample spreading over a surface of a subphase liquid reserved in a water tank, and a removal unit for removing a monomolecular film which has been orientation-packed with the packing unit, and placing the film on a substrate. The packing unit includes a packing control means controlling the movement of the barrier so as to compress a sample until the sample spreading over the surface of the subphase liquid provides a predetermined film pressure. An absorbance of the compressed sample is then measured, and thereafter it is determined whether or not the differential value of a $\pi$-A curve is zero while the barrier is moved as desired so as to provide a film having a predetermined value of absorbance.

Since the LB film forming device according to the present invention has a means for controlling packing as described above, a sample spreading over a subphase liquid reserved in a water tank is subjected to packing until a predetermined film pressure is provided and the absorbance of the sample is actually measured in such a state. Thereafter, a barrier may be moved until the above-mentioned absorbance reaches the set absorbance.

After a desired film is formed by using the above-mentioned control means, the resultant film is removed and placed onto a substrate plate.

These and other objects, features and advantages of the present invention will become more apparent upon a consideration of the following description of the preferred embodiments of the present invention taken in conjunction with the accompanying drawings.

DESCRIPTION OF PREFERRED EMBODIMENTS

Below, a preferred embodiment of an LB film forming device according to the present invention will be specifically described with reference to FIGS. 1–4.

Figure 1:
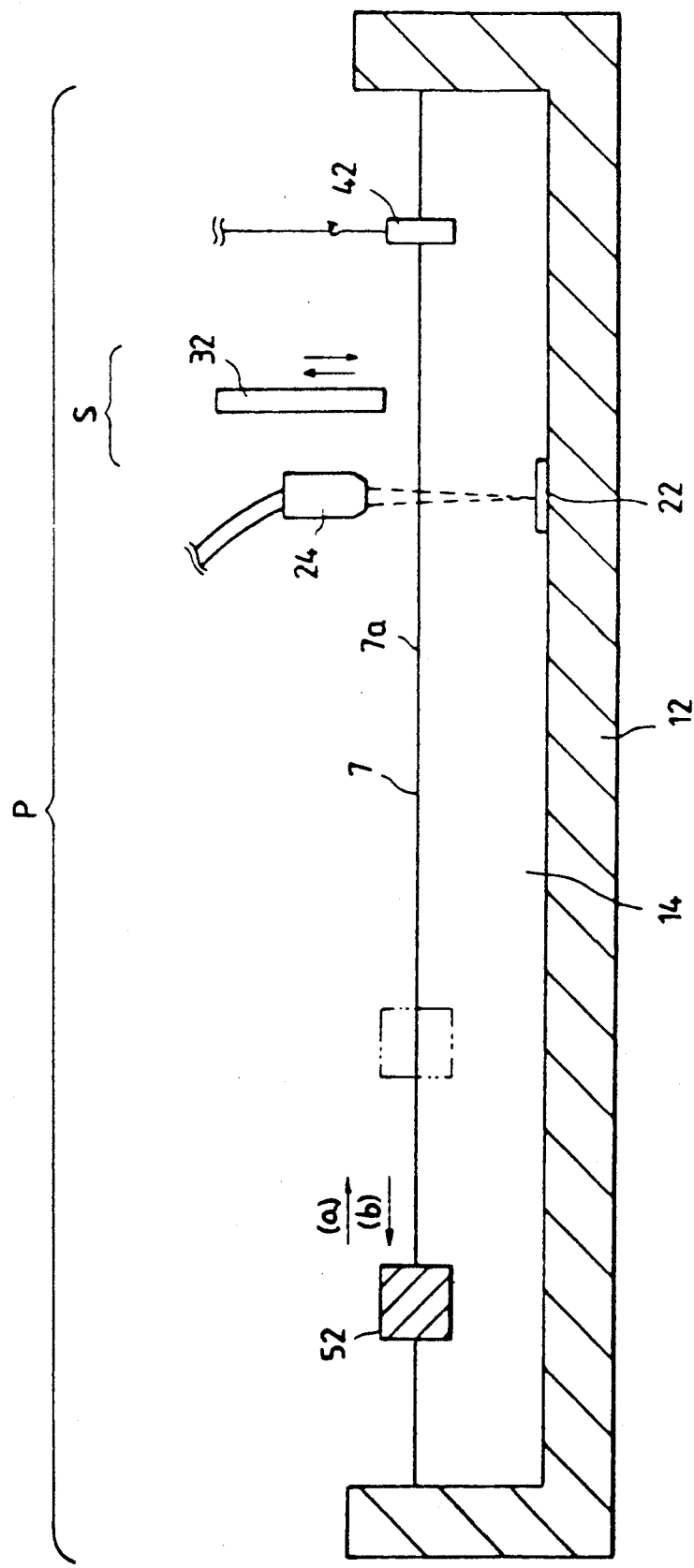
FIG. 1 is a schematic sectional view showing an embodiment of an LB film forming device according to the present invention.

Referring to FIG. 1, the LB film forming device according to the present invention has a packing unit P for compressing a sample 7 as a composition for monomolecular film formation, and a removal unit S for removing a monomolecular film 7a which has been orientation-packed by means of the above-mentioned packing unit P. The packing unit P includes a water tank 12 for containing a subphase liquid 14, a barrier 52 partially submerged in the subphase liquid 14, and a packing control device as described below.

The water tank has a substantially rectangular shape and contains the subphase liquid 14 wherein pH and salt concentration have been adjusted. The device shown in FIG. 1 is constructed so that the sample 7, as a composition for monomolecular film formation, may float on the surface layer portion of the subphase liquid 14.

The barrier 52 is used so that a constant pressure may be applied to the floating sample 7 to be orientation packed. Therefore, the barrier 52 has a substantially rectangular shape having substantially the same length as the width of the water tank along the depth direction in FIG. 1, and is connected to a barrier-driving operation unit (not shown). The barrier 52 may be moved forward and backward (i.e., in the direction of an arrow a or b in the drawing) on the water surface by means of the above-mentioned driving operation unit.

The sample 7, to be orientation-packed by the barrier 52, may be oriented by the packing control device. More specifically, the packing control device may roughly be classified into a detection unit and a control unit. On the right side of the figure, a surface pressure detection plate 42 dipped into the water surface is disposed as the detection unit so as to measure the surface pressure (film pressure), and a signal based on the detection due to the detection unit is transmitted to the control unit (not shown).

Further, at a predetermined distance from the surface pressure detection plate 42 (on the barrier 52 side), the detection unit for detecting the optical absorbance of the sample 7 is disposed.

The detection unit consists of a reflection mirror 22 fixed to the bottom surface of the water tank 12, an optical fiber head 24 disposed opposite to the reflection mirror 22 above the water surface, and a spectroscope connected to the optical fiber head 24. The signal based on the detection due to the absorbance of the detection unit is transmitted to the control unit (not shown) in the same manner as in the case of the above-mentioned signal based on the pressure.

Figure 2:
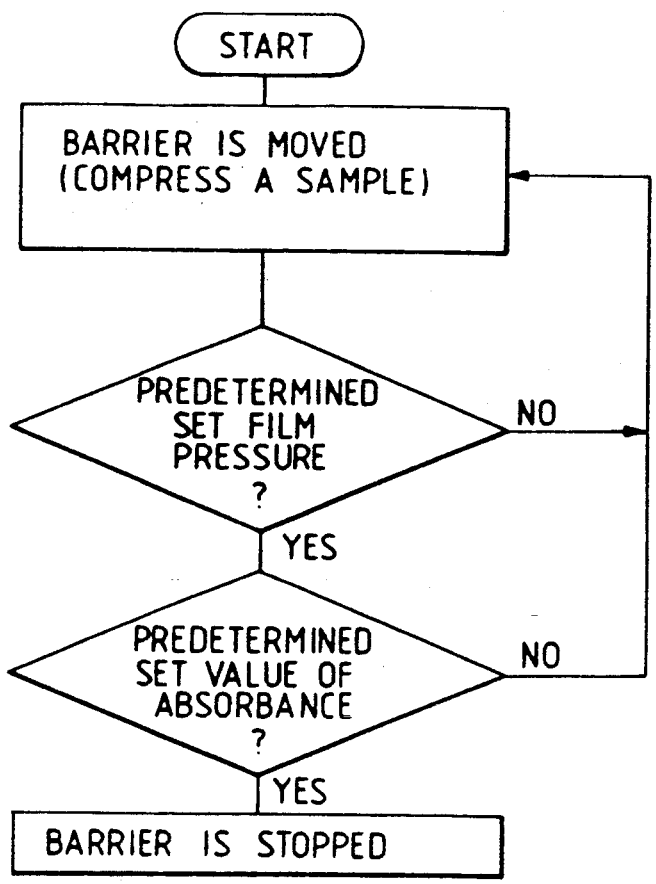
FIG. 2 is a flow chart for illustrating the operation of the packing control means used in the present invention.
Figure 4:
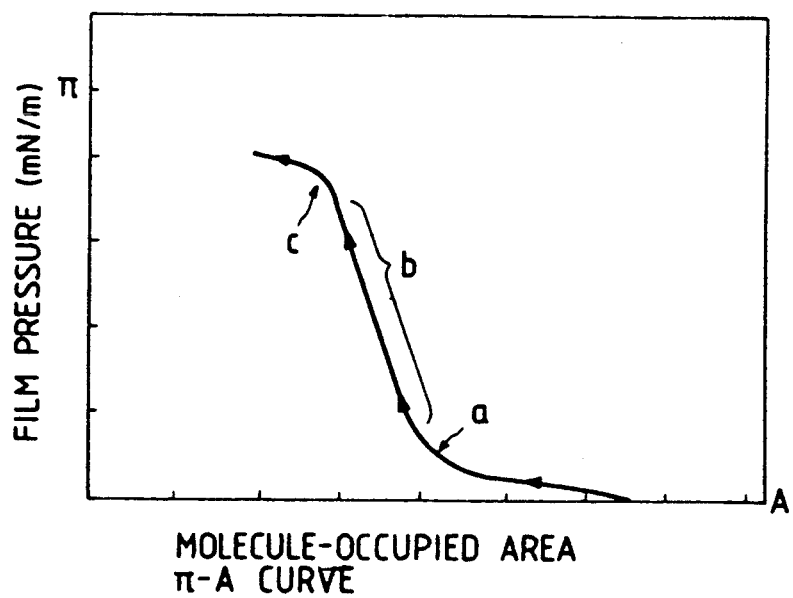
FIG. 4 is a graph showing a relationship between molecule-occupied area and film pressure based on the movement of a barrier.

The control unit is operated as shown by a flow chart of FIG. 2. The control in this unit will be specifically described in the explanation of the operation of the preferred embodiment below.

The monomolecular film 7a of the sample 7 which has been oriented on the water surface by means of the packing unit P as described above, is taken by the removal unit S.

The removal unit S consists of a substrate plate 32 for directly taking or transferring the monomolecular film 7a, and a driving system (not shown) for moving the substrate plate 32 up and down. In this embodiment a so-called "vertical method" is adopted. More specifically, the substrate plate 32 is vertically disposed with respect to the film surface of the monomolecular film 7a, and is moved up and down so that the film 7a may be transferred onto the substrate plate 32.

Next, the operation of the LB film forming device according to the preferred embodiment of the present invention will be described.

In order to orient the sample 7 spreading over the subphase liquid 14 reserved in the water tank 12 so as to form a monomolecular layer, set values of both the film pressure and absorbance are inputted to the control unit. Then, when the device initiates its operation, the operations shown by the flow chart of FIG. 2 are performed.

More specifically, the barrier 52 is first moved in the direction of the arrow a until a predetermined set film pressure is obtained. Then, when the pressure of the sample 7 reaches the set film pressure, the movement of barrier 52 is once stopped, and the absorbance of the sample 7 (monomolecular film 7a) is actually measured on the basis of the reflection light reflected by the reflection mirror 22. The barrier 52 is then further moved until the absorbance reaches the set absorbance value, and the barrier 52 is stopped at the point where the set absorbance value is provided.

After a desired film 7a is formed by using such a control device, the substrate plate 32 is vertically disposed and moved up and down a predetermined number of times so that the film may be transferred onto the substrate plate 32 to effect the removal of the film.

When the control device as described above is provided, an LB film having desired film characteristics may, stably be formed on the substrate plate 32. More specifically, the following advantages may, for example, be obtained.

Figure 3:
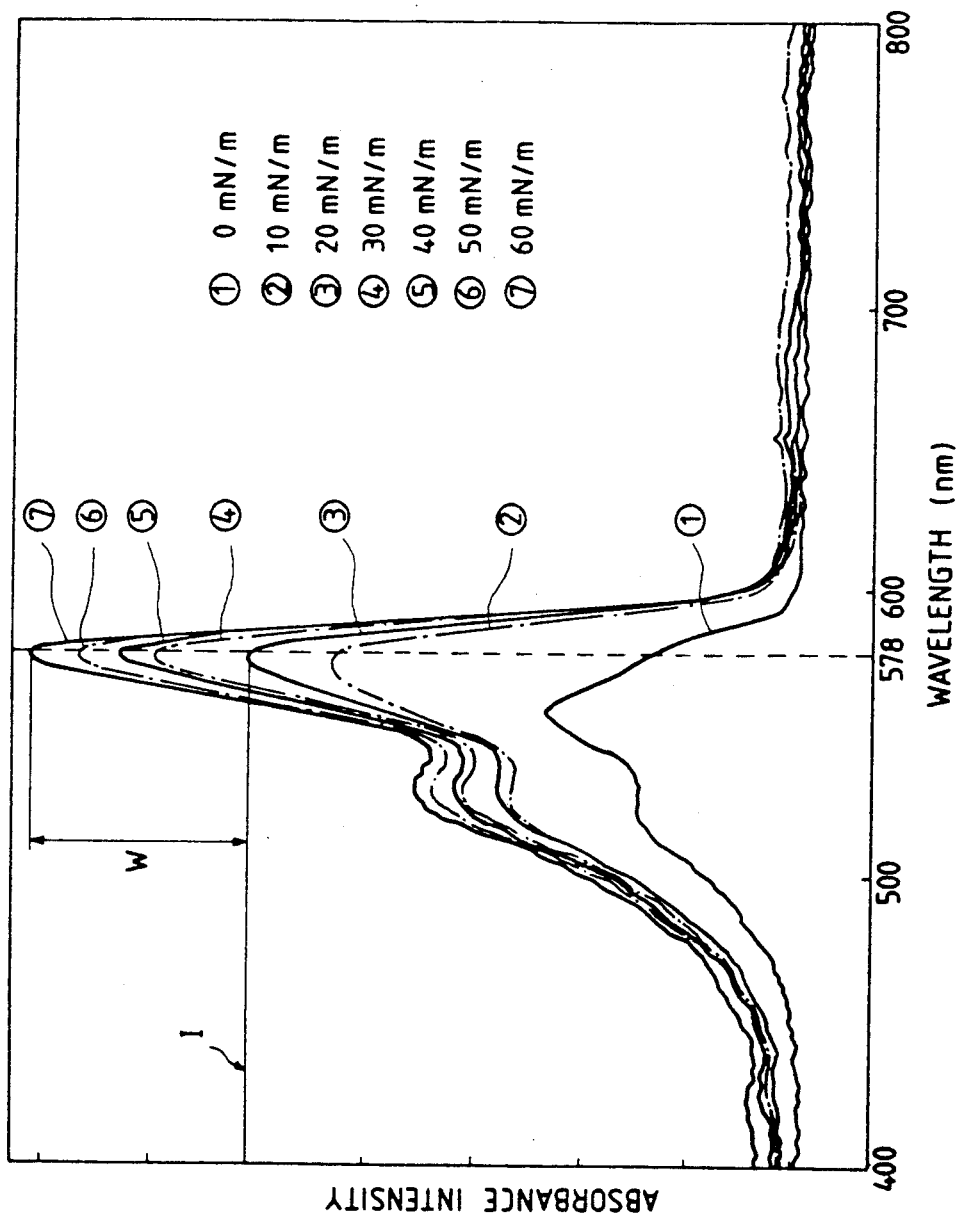
FIG. 3 is a graph showing a wavelength-absorbance intensity curve based on a change in surface pressure (film pressure)

(1) In a case where an organic dye (or coloring matter) is used as the sample, the formation of the J-aggregate may positively be determined by actually measuring a shift to the longer wavelength side as shown in FIG. 3.

More specifically, when the absorbance is measured at a measurement wavelength of about 578 nm and the intensity thereof is set to a value which is not lower than the point I in FIG. 3, the formation of the J-aggregate may be confirmed.

(2) In a case where an organic dye is used as the sample and the resultant film is applied to the recording film of an optical recording medium, even when the film thickness thereof is limited and a predetermined absorbance is required, the above-mentioned device may very easily be adapted.

More specifically, in the graph as shown in FIG. 3, the peak shift is completed and the J-aggregate is formed in the range represented by W, and the intensity of the absorption may change depending on a change in dye concentration (film pressure) of the monomolecular film. Accordingly, in a case where a relatively large margin is present in the film thickness, the absorbance may be set in the lower portion of the range W corresponding to a relatively low dye concentration (film pressure) of the monomolecular film wherein buckling may be avoided relatively easily, and a predetermined desired absorbance may be attained by using a relatively large number of movements of plate 32 for the removing of the film.

On the other hand, in a case where the resultant film is restricted to a very small thickness, e.g., a thickness corresponding to two movements of substitute plate 32, the absorbance may be set to the higher portion of the range W so as to use a relatively high concentration of the dye concentration (film pressure) of the monomolecular film. In such a case, however, the absorbance is set on the side wherein the buckling is more liable to occur.

Further, in the above-mentioned packing control device according to the preferred embodiment, when the movement of the barrier is controlled so as to provide a predetermined absorbance, a control device for confirming that the differential value of the $\pi$-A curve is zero may be provided as desired so that whether or not buckling of the film has occurred may be determined in the movement of the barrier.

The sample to be usable for the device according to the present invention is not restricted to an organic dye (or coloring matter), but can be other various organic films.

As described hereinabove, the LB film forming device according to the present invention has a packing control device by which a barrier is moved under the control thereof to compress a sample until the sample spreading over the surface of a subphase liquid has a predetermined surface pressure, the absorbance of the compressed sample is then measured, and thereafter the barrier is moved as desired so as to provide a predetermined set value of the absorbance. Accordingly, the LB film forming device according to the present invention may stably provide a film having predetermined film characteristics.

What is claimed is:

1. A device for forming an LB film, comprising:
    a packing unit for moving a barrier to compress a sample spreading over a surface of a subphase liquid reserved in a water tank; and
    a taking unit operatively connected to said water tank so as to transfer a monomolecular film formed on said sample which has been orientation-packed with the packing unit to a substrate plate;
    said packing unit comprising a packing control device operatively connected to said barrier, said packing control device moving said barrier under the control thereof to compress said sample until said sample spreading over said surface of said subphase liquid has a predetermined film pressure, said packing control device further having a detector for measuring an optical absorbance of the thus compressed sample when the predetermined film pressure is reached, wherein the barrier is moved under the control of the packing control device in response to said detector until a predetermined value of optical absorbance of said film is reached.

2. A device for forming an LB film according to claim 1, wherein said packing control device comprises a surface pressure detection device positioned so as to measure the surface pressure of said sample spreading over said surface of said subphase liquid, an absorbance detection device positioned so as to measure the optical absorbance of the sample, and a control unit coupled to said pressure detection device and said absorbance detection device so as to move said barrier under the control thereof.

3. A device for forming an LB film according to claim 2, wherein said surface pressure detection device comprises a plate for detecting the surface pressure of said sample.

4. A device for forming an LB film according to claim 2, wherein said absorbance detection device comprises a reflection mirror disposed on the bottom of said water tank, an optical fiber head disposed opposite to said reflection mirror above said film, and a spectrometer connected to said optical fiber head.

5. A device for forming an LB film comprising; a packing unit for moving a barrier to compress a sample spreading over a surface of a subphase liquid reserved in a water tank; and a taking unit for transferring a monomolecular film which has been orientation-packed with the packing unit onto a substrate plate;
    said packing unit comprising a packing control device coupled to said barrier so as to cause said barrier to compress said sample spreading over said surface of said subphase liquid, said packing control device having a sensor for measuring said sample film pressure until said sample exhibits a predetermined film pressure, said packing control device further having a detector for measuring an absorbance of the compressed sample, and means to determined whether or not the differential value of a n-A curve is zero while the barrier is moved under the control of the packing control device, so as to provide a predetermined value of the absorbance.

* * * * *